United States Patent
Narita et al.

(10) Patent No.: US 6,468,933 B1
(45) Date of Patent: *Oct. 22, 2002

(54) ALKALI-FREE GLASS AND METHOD OF PRODUCING THE SAME

(75) Inventors: Toshiharu Narita, Otsu; Hiroki Yamazaki, Shiga, both of (JP)

(73) Assignee: Nippon Electric Glass Co., Ltd., Otsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,659

(22) Filed: Sep. 21, 1999

(30) Foreign Application Priority Data

Sep. 22, 1998 (JP) .............................. 10-267808

(51) Int. Cl.$^7$ .......................... C03C 3/091; C03C 3/093; C03C 3/11
(52) U.S. Cl. .............................. 501/56; 501/66; 501/67; 501/69; 501/70; 501/72
(58) Field of Search .............................. 501/56, 66, 67, 501/68, 69, 70, 72

(56) References Cited

U.S. PATENT DOCUMENTS

| | | | | | |
|---|---|---|---|---|---|
| 3,649,311 | A | * | 3/1972 | Aroujo | 501/56 |
| 5,322,819 | A | * | 6/1994 | Aroujo et al. | 501/65 |
| 5,770,535 | A | * | 6/1998 | Brix et al. | 501/67 |
| 5,804,520 | A | * | 9/1998 | Morinaga et al. | 501/4 |
| 5,811,361 | A | * | 9/1998 | Miwa | 501/70 |
| 5,824,127 | A | | 10/1998 | Bange et al. | |
| 5,851,939 | A | * | 12/1998 | Miwa | 501/66 |
| 5,908,703 | A | * | 6/1999 | Brix et al. | 428/426 |
| 6,096,670 | A | * | 8/2000 | Lautenschlager et al. | 501/67 |
| 6,128,924 | A | | 10/2000 | Bange et al. | |

FOREIGN PATENT DOCUMENTS

| | | | |
|---|---|---|---|
| JP | 63-74935 | | 4/1988 |
| JP | 10-324526 | * | 12/1998 |
| JP | 11-011975 | * | 1/1999 |
| JP | 11-043350 | * | 2/1999 |
| WO | 97/11919 | * | 4/1997 |

* cited by examiner

Primary Examiner—David R Sample
(74) Attorney, Agent, or Firm—Collard & Roe, P.C.

(57) ABSTRACT

An alkali-free glass essentially consists of, by weight percent, 40–70% $SiO_2$, 6–25% $Al_2O_3$, 5–20% $B_2O_3$, 0–10% MgO, 0–15% CaO, 0–30% BaO, 0–10% SrO, 0–10% ZnO, 0.05–2% $SnO_2$, and 0.005–1% $Cl_2$, and substantially contains no alkali metal oxide.

4 Claims, No Drawings

ALKALI-FREE GLASS AND METHOD OF PRODUCING THE SAME

BACKGROUND OF THE INVENTION (1) Technical Field

The present invention relates to an alkali-free glass and, in particular, to an alkali-free glass for use as a light transparent glass substrate for a display and the like as well as a method of producing the same.

(2) Prior Art

Conventionally, an alkali-free glass has been used as a light transparent glass substrate for a liquid crystal display and the like. The alkali-free glass for use in such a display is required to be free from bubbles resulting in a display defect, in addition to various characteristics such as heat resistance and chemical resistance.

As such an alkali-free glass, various kinds of glasses have been proposed. In Japanese Unexamined Patent Publication (JP-A) No. 63-74935, the present applicant proposes an $SiO_2$—$Al_2O_3$—$B_2O_3$—$CaO$—$BaO$ alkali-free glass.

In order to obtain a glass without bubbles, it is important to select a fining agent capable of generating a fining gas in a temperature range from the temperature of vitrification to the temperature of homogenization melting. Specifically, the fining of a glass is carried out by expelling a gas generating during the vitrification from a glass melt with the help of the fining gas and further removing very small remaining bubbles after they are enlarged by the fining gas generated again during the homogenization melting to float up.

In the meanwhile, the alkali-free glass for use as a glass substrate for a liquid crystal display is high in viscosity of the glass melt so that a melting process is carried out at a high temperature in comparison with a glass containing an alkali component. In the alkali-free glass of the type, the vitrification generally occurs at 1200–1300° C. while the fining and the homogenization are performed at a high temperature of 1400° C. or more. Under the circumstances, $As_2O_3$ capable of producing the fining gas in a wide temperature range (on the order of 1200–1600° C.) is widely used as the fining agent.

However, $As_2O_3$ is highly toxic and may possibly cause environmental pollution during a manufacturing process of the glass and during disposal of a waste glass. In this reason, the use of $As_2O_3$ is being limited.

SUMMARY OF THE INVENTION

It is an object of the present invention to provide an alkali-free glass which does not use $As_2O_3$ as a fining agent and which is free from bubbles resulting in a display defect, and to provide a method of producing the same.

As a result of various experiments, the present inventors have found out that the above-mentioned object can be achieved by using, as a fining agent, a combination of $SnO_2$ and chloride instead of $As_2O_3$, and propose the present invention.

Specifically, an alkali-free glass according to one aspect of the present invention is characterized in that the glass essentially consists of, by weight percent, 40–70% $SiO_2$, 6–25% $Al_2O_3$, 5–20% $B_2O_3$, 0–10% MgO, 0–15% CaO, 0–30% BaO, 0–10% SrO, 0–10% ZnO, 0.05–2% $SnO_2$, and 0.005–1% $Cl_2$, and that the glass substantially contains no alkali metal oxide.

A method of producing an alkali-free glass according to another aspect of the present invention comprises preparation of a glass batch mixed so as to obtain a glass which essentially consists of, by weight percent, 40–70% $SiO_2$, 6–25% $Al_2O_3$, 5–20% $B_2O_3$, 0–10% MgO, 0–15% CaO, 0–30% BaO, 0–10% SrO, and 0–10% ZnO and which substantially contains no alkali metal oxide, melting of the glass batch, and forming of the glass melt, and is characterized by addition of, as a fining agent, 0.05–2 weight % $SnO_2$ and 0.01–2 weight % chloride in terms Of $Cl_2$ into the glass batch.

DESCRIPTION OF PREFERRED EMBODIMENTS

Prior to description of embodiments of the present invention, the principle of the present invention will be described.

$SnO_2$ used in the present invention generates a large amount of fining gas as a result of variation in valence of Sn ions, which takes place in a temperature range of 1400° C. or more. On the other hand, chloride is decomposed and volatilized in a temperature range not lower than 1200° C. to generate the fining gas (chroline gas, etc.). As the temperature is elevated, decomposition and volatilization become very active to generate a large amount of the fining gas.

Accordingly, the use of a combination of $SnO_2$ and chloride as the fining agent provides a high fining effect in a wide temperature range from a comparatively low temperature in which the vitrification occurs to a high temperature in which homogenization melting occurs.

As a result, it is possible to obtain the alkali-free glass without bubbles resulting in a display defect.

Next, description will be made about a method of producing the alkali-free glass according to the present invention.

At first, a glass batch is prepared so as to obtain a glass having a desired composition. Description will hereafter be made about the glass composition range and the reason why each content is so defined.

$SiO_2$ is a component serving as a network of the glass. The content is 40–70%, preferably, 45–65%. When the content of $SiO_2$ is less than 40%, chemical resistance is degraded and a strain point is lowered so that heat resistance is degraded. On the other hand, when the content is more than 70%, high-temperature viscosity is increased so that the meltability is deteriorated and devitrified substances of cristobalite readily precipitate.

$Al_2O_3$ is a component to enhance the heat resistance and devitrification resistance of the glass. The content is 6–25%, preferably, 10–20%. When the content of $Al_2O_3$ is less than 6%, the devitrification temperature remarkably rises so that the devitrification is readily caused to occur in the glass. When the content is more than 25%, acid resistance, particularly, buffered-hydrofluoric-acid resistance is degraded so that the cloudiness is readily caused to occur on the surface of the glass substrate.

$B_2O_3$ is a component serving as a flux to lower the viscosity and to facilitate melting. The content is 5–20%, preferably, 6–15%. When the content of $B_2O_3$ is less than 5%, the effect as the flux is insufficient. When the content is more than 20%, the hydrochloric acid resistance is degraded and the strain point is lowered so that the heat resistance is degraded.

$SnO_2$ and chloride used as the fining agent in the present invention exhibits a slightly inferior fining effect during vitrification at a low temperature in comparison with the fining effect during the homogenization melting at a high temperature. In case where the fining effect is insufficient in such a low temperature range, a melting temperature is elevated to a higher temperature. However, if it is difficult to elevate the melting temperature, $B_2O_3$ is preferably contained to a ratio of 8.4% or more.

The reason is as follows. When at least 8.4% $B_2O_3$ is added, it works strongly as a flux to readily expel the gas generating during the vitrification. This complements the fining effect of $SnO_2$ and chloride in the low temperature range.

MgO is a component for decreasing the high-temperature viscosity without lowering the strain point so as to facilitate melting of the glass. The content is 0–10%, preferably, 0–7%. When the content of MgO is more than 10%, the buffered-hydrofluoric-acid resistance of the glass is significantly degraded.

CaO has a function similar to that of MgO. The content is 0–15%, preferably, 0–10%. When the content of CaO is more than 15%, the buffered-hydrofluoric-acid resistance of the glass is significantly degraded.

BaO is a component to improve the chemical resistance of the glass and to improve the devitrification resistance. The content is 0–30%, preferably, 0–20%. This is because, when the content of BaO is more than 30%, the strain point is lowered so that the heat resistance is degraded.

SrO has an effect similar to that of BaO. The content is 0–10%, preferably, 0–7%. The reason is that the content of SrO more than 10% is unfavorable because the devitrification is increased.

ZnO is a component to improve the buffered-hydrofluoric-acid resistance and the devitrification resistance. The content is 0–10%, preferably, 0–7%. This is because, when the content of ZnO is more than 10%, the glass tends to be devitrified and the strain point is lowered so that the heat resistance cannot be obtained.

When the total content of MgO, CaO, BaO, SrO, and ZnO is less than 5%, the high-temperature viscosity is increased so that the meltability is degraded and the glass is readily devitrified. On the other hand, the total content more than 30% is unfavorable because the heat resistance and the acid resistance are degraded.

In addition to the above-described components, it is possible to add $ZrO_2$, $TiO_2$, $Fe_2O_3$, and the like up to 5% in total. It is preferable not to add $Sb_2O_3$ widely used as a substitute fining agent for $As_2O_3$ because it is toxic although not so strong as $As_2O_3$.

Next, $SnO_2$ and chloride are added to the glass batch.

The amount of $SnO_2$ to be added is 0.05–2weight % with respect to the glass batch as 100weight %. This is because, when the content of $SnO_2$ is less than 0.05%, it is difficult to remove the bubbles remaining in the glass melt during the homogenization melting. On the other hand, when the content is more than 2%, the glass tends to be devitrified.

The amount of chloride to be added is 0.01–2 weight % in terms of $Cl_2$. This is because, when the content of chloride is less than 0.01%, it is difficult to expel the gas generating during the vitrification and to remove the bubbles remaining in the glass melt during the homogenization melting. On the other hand, when the content of chloride is more than 2%, the amount of volatilization is excessive so that the glass tends to be deteriorated. As chloride, use can be made of $BaCl_2$, $CaCl_2$, and the like.

Then, the glass batch thus prepared is melted. As the glass batch is heated, the vitrification at first takes place. At this time, the fining gas such as chlorine gas is generated as a result of decomposition of chloride so that the gas generating during the vitrification is expelled from the glass melt. Furthermore, during the homogenization melting at a higher temperature, oxygen gas generates as a result of chemical reaction following the variation in valence of $SnO_2$. In addition, chloride is decomposed and volatilized to produce the gas. Thus, very small bubbles remaining in the glass melt are removed.

Thereafter, the glass melt is formed into a desired shape. If the glass of the present invention is used as a display, the glass melt is formed into a thin plate shape by the use of a fusion process, a downdraw process, a float process, a roll-out process, and the like.

In the above-mentioned manner, it is possible to obtain the alkali-free glass which essentially consists of, by weight percent, 40–70% $SiO_2$, 6–25% $Al_2O_3$, 5–20% $B_2O_3$, 0–10% MgO, 0–15% CaO, 0–30% BaO, 0–10% SrO, 0–10% ZnO, 0.05–2% $SnO_2$, and 0.005–1% $Cl_2$, and which substantially contains no alkali metal oxide.

Now, description will be made about examples of the present invention.

EXAMPLE 1

The following Table 1 shows the effects of $SnO_2$ and chloride. A sample a is a conventional alkali-free glass with $As_2O_3$ added as a fining agent. A sample b is an alkali-free glass prepared from the sample a with $As_2O_3$ removed therefrom. A sample c is an alkali-free glass with only $SnO_2$ added. A sample d is an alkali-free glass with only chloride ($BaCl_2$) added. A sample e is an alkali-free glass of the present invention with $SnO_2$ and chloride used in combination.

TABLE 1

| Sample No. | a | b | c | d | (weight %) e |
|---|---|---|---|---|---|
| Glass Batch Composition | | | | | |
| $SiO_2$ | 60.0 | 60.0 | 60.0 | 60.0 | 60.0 |
| $Al_2O_3$ | 16.0 | 16.0 | 16.0 | 16.0 | 16.0 |
| $B_2O_3$ | 8.5 | 8.5 | 8.5 | 8.5 | 8.5 |
| MgO | 4.0 | 4.0 | 4.0 | 4.0 | 4.0 |
| CaO | 1.0 | 1.0 | 1.0 | 1.0 | 1.0 |
| BaO | 6.0 | 6.0 | 6.0 | 6.0 | 6.0 |
| SrO | 3.5 | 3.5 | 3.5 | 3.5 | 3.5 |
| ZnO | 1.0 | 1.0 | 1.0 | 1.0 | 1.0 |
| $SnO_2$ | — | — | 0.3 | — | 0.3 |
| $Cl_2$ | — | — | — | 0.3 | 0.3 |
| $As_2O_3$ | 0.3 | — | — | — | — |
| Fineness 1650° C. · 1 hr | ◎ | x | Δ | Δ | ◎ |

Each of the samples was prepared as follows.

A glass batch which has a composition specified in the above-mentioned Table 1 was prepared and melted in an electric furnace at a temperature of 1650° C. for one hour.

Next, a glass melt was poured onto a carbon table and gradually cooled. Thereafter, the number of bubbles remaining in the glass were counted. Symbols X, Δ, ○, and ◎ represent the cases where the number of the bubbles in the glass of 100 g is more than 100, 11–100, 6–10, and 5 or less, respectively. The results are shown in Table 1. In the composition of the glass batch shown in the above Table, the content of each component is represented in terms of oxide while the content of chloride is represented in terms of $Cl_2$.

As is obvious from Table 1, the sample b with no fining agent added seriously degraded in fineness.

The sample c with only $SnO_2$ added generated a large amount of fining gas during the homogenization melting. However, the fineness during the vitrification was insufficient. As a result, the fineness was inferior than that of the sample a with $As_2O_3$ added.

As to the glass of the sample d with only chloride added, the fining gas generated during the vitrification and during the homogenization melting. However, the amount of the fining gas was insufficient so that the fineness was degraded.

On the other hand, the glass of the sample e with $SnO_2$ and chloride added was excellent in fineness like the glass of the sample a with $As_2O_3$ added.

EXAMPLE 2

For evaluating the relationship between the fineness and the content of $B_2O_3$, the fineness was evaluated by varying the amount of $B_2O_3$ with respect to the sample e of Example 1. The evaluation was performed in the manner similar to Example 1 except that the melting temperature was 1600° C. The results are shown in the following Table 2.

TABLE 2

| Sample No. | e-1 | e-2 | e | e-3 | e-4 | e-5 |
|---|---|---|---|---|---|---|
| Glass batch composition | | | | | | |
| $SiO_2$ | 62.0 | 60.7 | 60.0 | 58.7 | 57.4 | 56.1 |
| $Al_2O_3$ | 16.5 | 16.1 | 16.0 | 15.7 | 15.3 | 15.0 |
| $B_2O_3$ | 5.5 | 7.5 | 8.5 | 10.5 | 12.5 | 14.5 |
| MgO | 4.1 | 4.0 | 4.0 | 3.9 | 3.8 | 3.7 |
| CaO | 1.0 | 1.0 | 1.0 | 1.0 | 1.0 | 1.0 |
| BaO | 6.2 | 6.1 | 6.0 | 5.9 | 5.7 | 5.6 |
| SrO | 3.6 | 3.5 | 3.5 | 3.4 | 3.4 | 3.3 |
| ZnO | 1.0 | 1.0 | 1.0 | 1.0 | 1.0 | 1.0 |
| $SnO_2$ | 0.3 | 0.3 | 0.3 | 0.3 | 0.3 | 0.3 |
| $Cl_2$ | 0.3 | 0.3 | 0.3 | 0.3 | 0.3 | 0.3 |
| Fineness 1600° C. · 1 hr | ○ | ○ | ⊙ | ⊙ | ⊙ | ⊙ |

As is obvious from the above Table 2, the samples e and e-3 through e-5 with the content of $B_2O_3$ being 8.4% or more had an excellent fineness even if the melting temperature was low, because the removal of the bubbles during the vitrification was sufficient. This fact suggests that, if a fining effect is insufficient in a low temperature range, it can be improved by increasing the amount of $B_2O_3$.

EXAMPLE 3

The following Tables 3–5 show examples (samples Nos. 1–13) of an alkali-free glass obtained by the method according to the present invention.

TABLE 3

| Sample No. | 1 | 2 | 3 | 4 | 5 |
|---|---|---|---|---|---|
| Glass composition | | | | | (weight %) |
| $SiO_2$ | 58.0 | 48.5 | 59.0 | 51.0 | 56.0 |
| $Al_2O_3$ | 16.0 | 11.0 | 15.0 | 9.5 | 11.0 |
| $B_2O_3$ | 8.5 | 14.5 | 10.5 | 12.5 | 8.5 |
| MgO | 1.0 | — | 0.5 | — | 2.0 |
| CaO | 4.0 | — | 4.5 | — | 3.5 |
| BaO | 9.5 | 24.5 | 6.0 | 25.0 | 12.0 |

TABLE 3-continued

| Sample No. | 1 | 2 | 3 | 4 | 5 |
|---|---|---|---|---|---|
| SrO | 2.0 | 0.5 | 3.0 | — | 6.0 |
| ZnO | — | — | — | — | — |
| $ZrO_2$ | — | — | — | 0.5 | — |
| $TiO_2$ | — | — | — | — | — |
| $SnO_2$ | 0.7 | 0.8 | 1.0 | 1.4 | 0.6 |
| $Cl_2$ | 0.3 | 0.2 | 0.5 | 0.1 | 0.4 |
| Fineness 1650° C. · 1 hr | ⊙ | ⊙ | ⊙ | ⊙ | ⊙ |
| Strain point (° C.) | 660 | 590 | 645 | 605 | 630 |
| Hydrochloric-acid resistance | ○ | ○ | ○ | ○ | ○ |
| Buffered-hydrofluoric-acid resistance | ○ | ○ | ○ | ○ | ○ |

Each of the samples was prepared as follows.

A glass batch was prepared so as to obtain each of glasses having compositions specified in the above-mentioned Table 3 and the following Tables 4 and 5. The fineness was evaluated in the manner similar to Example 1.

The glass batch was melted in an electric furnace in a temperature range of 1600–1650° C. for 8–16 hours and formed to obtain each sample. As chloride, $BaCl_2$ was used. Each sample thus obtained was evaluated with respect to heat resistance and chemical resistance.

The results are shown in Tables 3–5.

As is obvious from the above Table 3 and the following Tables 4 and 5, each sample was excellent in fineness and good in heat resistance and chemical resistance.

TABLE 4

| Sample No. | 6 | 7 | 8 |
|---|---|---|---|
| Glass composition | | | (weight %) |
| $SiO_2$ | 53.5 | 56.0 | 59.0 |
| $Al_2O_3$ | 20.5 | 13.0 | 15.0 |
| $B_2O_3$ | 9.5 | 9.0 | 10.0 |
| MgO | 9.5 | — | — |
| CaO | 5.0 | 5.0 | 5.0 |
| BaO | — | 12.0 | 4.0 |
| SrO | — | 3.0 | 5.0 |
| ZnO | — | 1.0 | 1.0 |
| $ZrO_2$ | — | — | — |
| $TiO_2$ | — | 0.5 | — |
| $SnO_2$ | 1.2 | 0.2 | 0.5 |
| $Cl_2$ | 0.3 | 0.3 | 0.5 |
| Fineness 1650° C. · 1 hr | ⊙ | ⊙ | ⊙ |
| Strain point (° C.) | 670 | 640 | 650 |
| Hydrochloric-acid resistance | ○ | ○ | ○ |
| Buffered-hydrofluoric-acid resistance | ○ | ○ | ○ |

As the heat resistance, the strain point was measured according to a method under the ASTM C336-71.

As the chemical resistance, the hydrochloric-acid resistance was evaluated by immersing each sample for 24 hours in a 10 weight % hydrochloric acid solution held at 80° C. and thereafter observing the surface condition of the glass substrate. The symbol ○ represents the case where no discoloration occurred on the surface of the glass substrate.

The buffered-hydrofluoric-acid resistance was evaluated by immersing each sample for 30 minutes in a buffered hydrofluoric acid solution held at 20° C. and comprising 38.7 weight % ammonium fluoride and 1.6 weight % hydrofluoric acid and thereafter observing the surface condition of the glass substrate. The symbol ○ represents the case where no change occurred on the surface of the glass substrate.

TABLE 5

| Sample No. | 9 | 10 | 11 | (weight %) 12 | 13 |
|---|---|---|---|---|---|
| Glass composition | | | | | |
| $SiO_2$ | 54.5 | 62.5 | 65.0 | 55.0 | 59.6 |
| $Al_2O_3$ | 19.0 | 18.0 | 19.5 | 13.5 | 15.9 |
| $B_2O_3$ | 10.0 | 7.0 | 6.0 | 8.7 | 8.4 |
| MgO | — | 4.5 | — | 1.5 | 4.0 |
| CaO | 3.0 | — | 7.0 | 14.5 | 1.0 |
| BaO | 1.5 | 2.5 | 1.0 | 1.0 | 6.0 |
| SrO | 9.0 | 2.0 | 0.5 | 1.0 | 3.5 |
| ZnO | — | 3.0 | 0.5 | 1.5 | 1.0 |
| $ZrO_2$ | — | — | — | 1.0 | — |
| $TiO_2$ | 2.0 | — | — | 1.0 | — |
| $SnO_2$ | 0.9 | 0.1 | 0.3 | 1.0 | 0.3 |
| $Cl_2$ | 0.1 | 0.4 | 0.2 | 0.3 | 0.3 |
| Fineness 1650° C. · 1 hr | ◎ | ○ | ○ | ◎ | ◎ |
| Strain point (° C.) | 675 | 690 | 705 | 635 | 665 |
| Hydrochloric-acid resistance | ○ | ○ | ○ | ○ | ○ |
| Buffered-hydrofluoric-acid resistance | ○ | ○ | ○ | ○ | ○ |

As described so far, according to the present invention, it is possible to produce the alkali-free glass excellent in fineness and free from bubbles resulting in a display defect since $SnO_2$ and chloride are used in combination as the fining agent.

Further, the alkali-free glass according to the present invention is free from bubbles resulting in a display defect and is excellent in heat resistance and chemical resistance, and is therefore suitable particularly as a light transparent glass substrate for a display.

What is claimed is:

1. A substantially alkali-free glass consisting essentially of, by weight, 40–70% $SiO_2$, 6–25% $Al_2O_3$, 6–15% $B_2O_3$, 0–4.5% MgO, 0–15% CaO, 0–30% BaO, 0–10% SrO, 0–10% ZnO, 0.05–2% $SnO_2$, and 0.005–1% $Cl_2$, said glass being free of $Sb_2O_3$.

2. The glass of claim 1, containing at least 8.4%, by weight, of $B_2O_3$.

3. A method of producing a substantially alkali-free glass, comprising the steps of:

preparing a glass batch mixed so as to obtain a glass which consists essentially of, by weight, 40–70% $SiO_2$, 6–25% $Al_2O_3$, 6–15% $B_2O_3$, 0–4.5% MgO, 0–15% CaO, 0–30% BaO, 0–10% SrO, and 0–10% ZnO and which is free of $Sb_2O_3$;

adding, as a fining agent, by weight, 0.05–2% $SnO_2$ and 0.01–2% chloride in terms of $Cl_2$ to said glass batch;

melting said glass batch; and forming the glass melt.

4. The method of claim 3, wherein the glass contains at least 8.4%, by weight, of $B_2O_3$.

* * * * *